United States Patent
Teoh

[11] Patent Number: 6,014,968
[45] Date of Patent: Jan. 18, 2000

[54] TUBULAR HEATING-PIPE SOLAR WATER-HEATING-SYSTEM WITH INTEGRAL TANK

[75] Inventor: Siang Teik Teoh, Kuala Lumpur, Malaysia

[73] Assignee: Alam Hassan, San Jose, Calif.

[21] Appl. No.: 08/705,587

[22] Filed: Aug. 29, 1996

[30] Foreign Application Priority Data

Sep. 26, 1995 [MY] Malaysia ........................ PI 950 2857
Jan. 24, 1996 [MY] Malaysia ........................ PI-960 0267

[51] Int. Cl.[7] .................................................. F24J 2/44
[52] U.S. Cl. ........................ 126/639; 126/655; 126/657
[58] Field of Search .................................. 126/635, 636, 126/639, 638, 657, 640, 655, 661, 906, 907, 603, 652; 165/104.17, 104.21

[56] References Cited

U.S. PATENT DOCUMENTS

| | | | |
|---|---|---|---|
| 2,122,821 | 7/1938 | Mohr ........................................ | 126/639 |
| 2,247,830 | 7/1941 | Abbot ....................................... | 126/638 |
| 4,084,578 | 4/1978 | Ishibashi ................................. | 126/271 |
| 4,353,352 | 10/1982 | Zinn ........................................ | 126/426 |
| 4,438,759 | 3/1984 | Kitajima et al. ......................... | 126/433 |
| 4,505,261 | 3/1985 | Hunter ..................................... | 126/635 |
| 4,566,431 | 1/1986 | Takeuchi et al. ........................ | 126/652 |
| 4,615,329 | 10/1986 | Takeuchi et al. ........................ | 126/906 |
| 4,724,826 | 2/1988 | Muramatsu .............................. | 126/433 |
| 4,766,885 | 8/1988 | Muramatsu .............................. | 126/433 |

FOREIGN PATENT DOCUMENTS

| | | | |
|---|---|---|---|
| 24763 | 2/1983 | Japan ..................................... | 126/639 |
| 259861 | 12/1985 | Japan ..................................... | 126/639 |

*Primary Examiner*—James C. Yeung
*Attorney, Agent, or Firm*—Donald E. Schreiber

[57] ABSTRACT

A collector core (104) for a solar water-heating-system (100) includes a plurality of heat-absorbing pipes (108) each of which surrounds a cooler-water return-pipe (116). The heating-pipes (108) may connect directly to an insulated hot-water storage-tank (104) from which cooler water descends through the return-pipes (116) into the heating-pipes (108). Upon reaching the end of the return-pipes (116), the cooler water flows outward into the space between the surrounding heating-pipes (108) and the inner return-pipes (116). Upon warming, water between the two pipes (108, 116) rises upward back to the hot-water storage-tank (104) thus completing the thermosyphon flow cycle. Preferably, the inner return-pipe (116) is made of polyvinyl chloride ("PVC"), polybutelene ("PB"), or other compressible material which permits collector core (106) operation both in freezing and non-freezing environments. Alternatively, the collector core (106) may be added to an existing solar water-heating panel (102') to improve its operation.

12 Claims, 9 Drawing Sheets

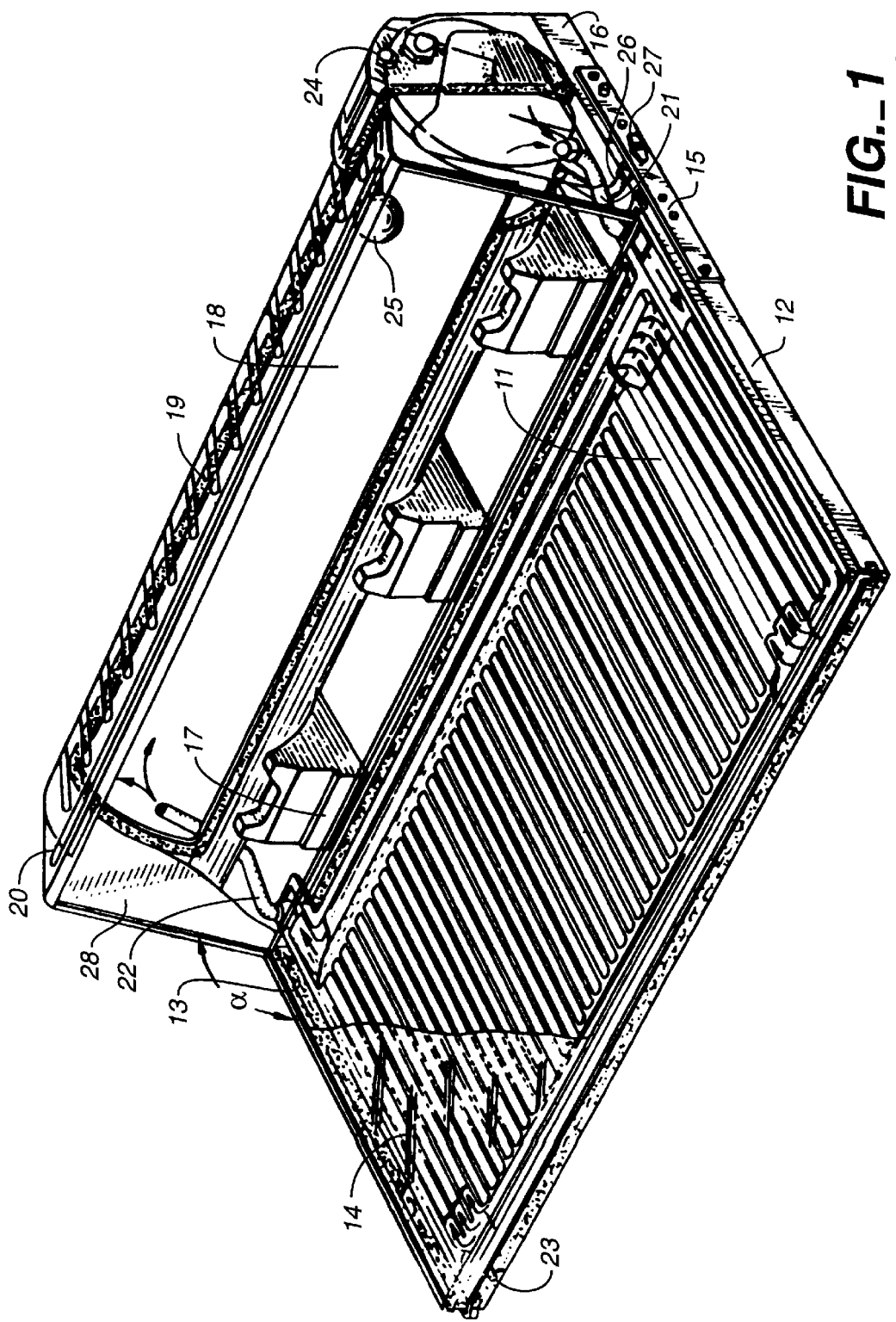
FIG._1
*(PRIOR ART)*

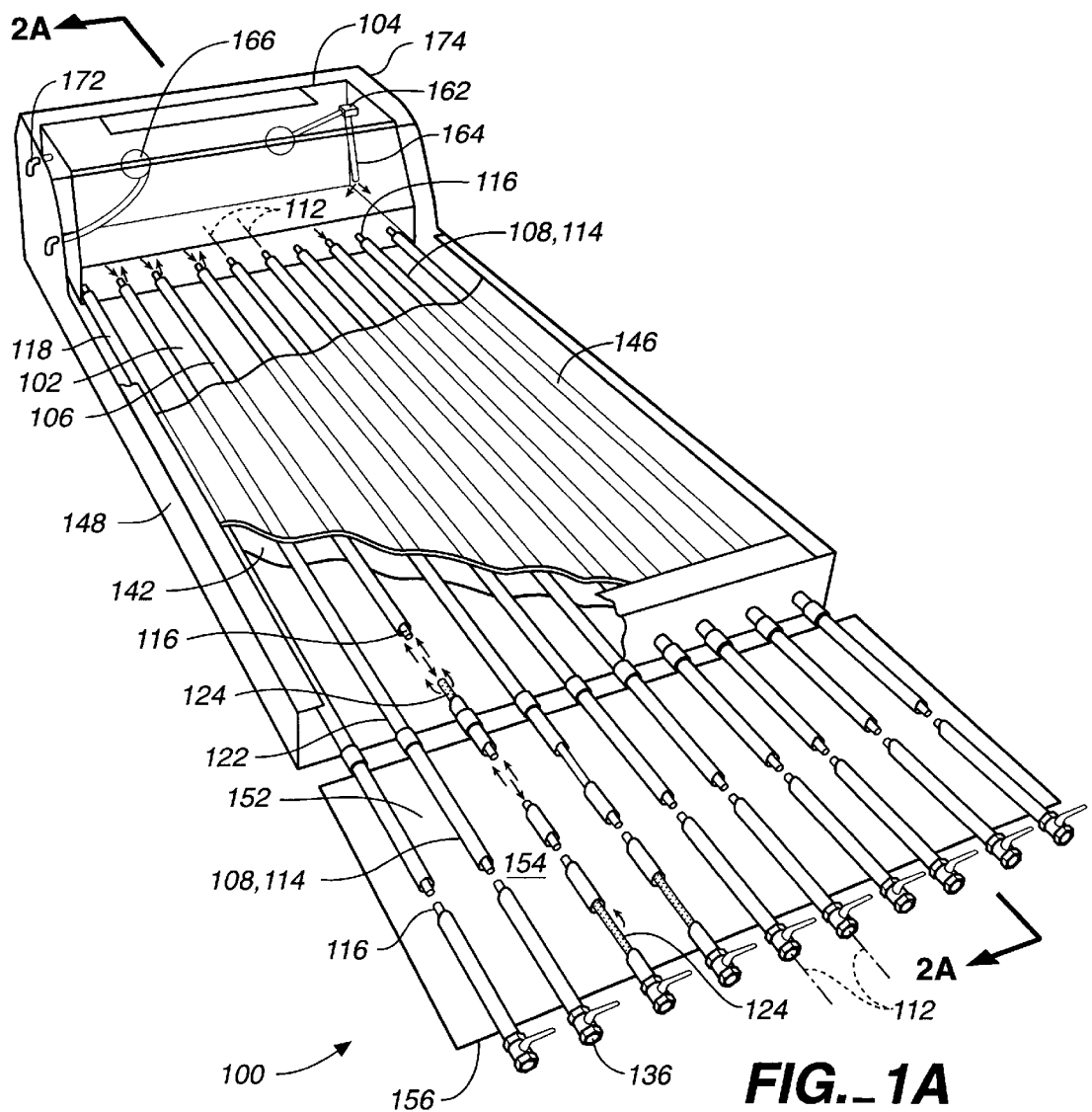
FIG._1A

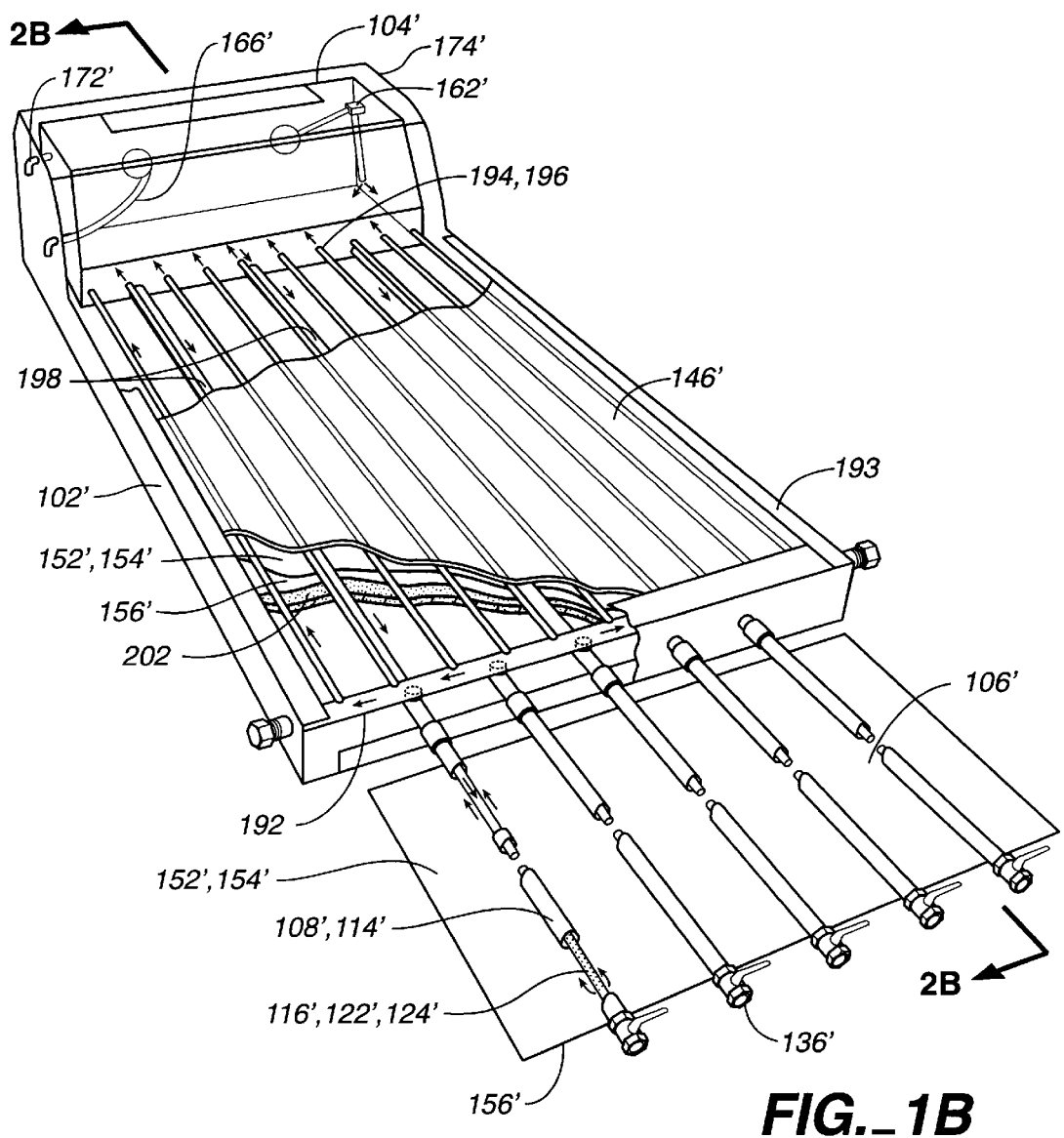
FIG._1B

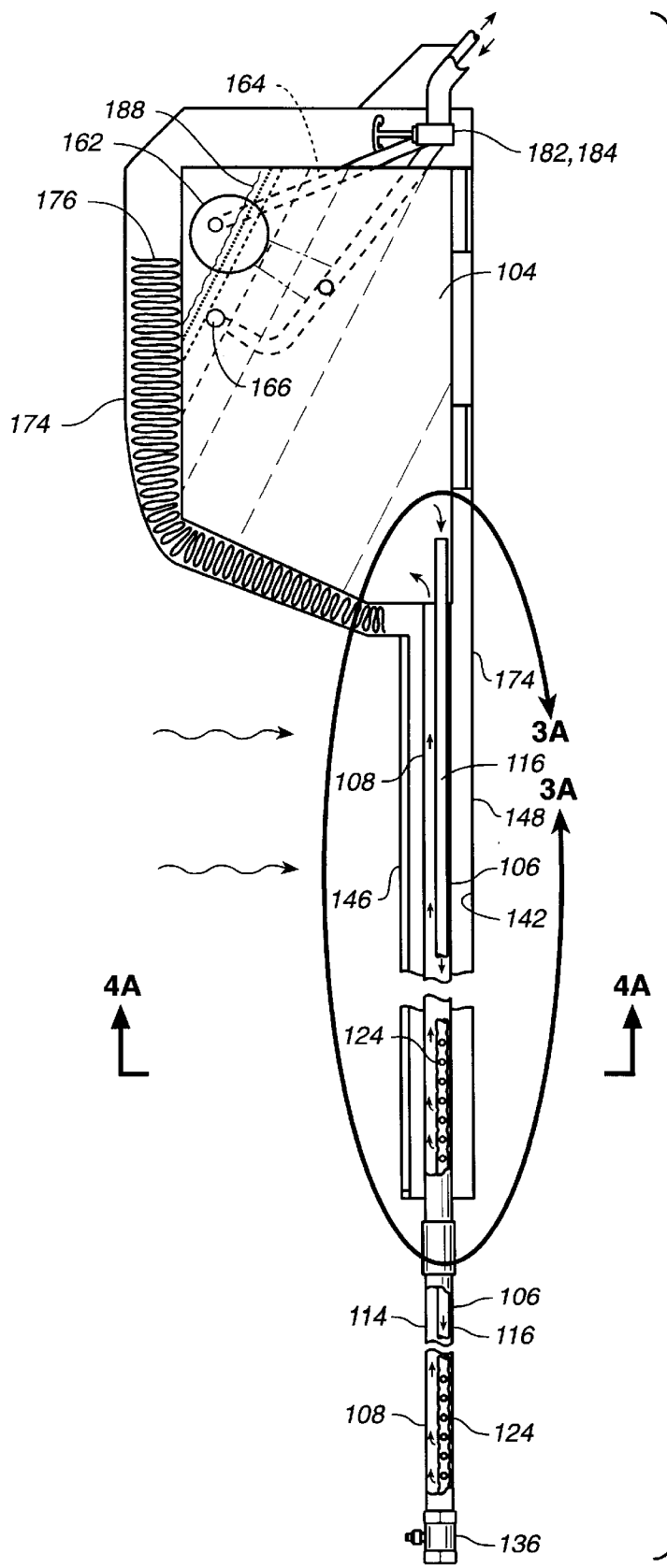
FIG._2A

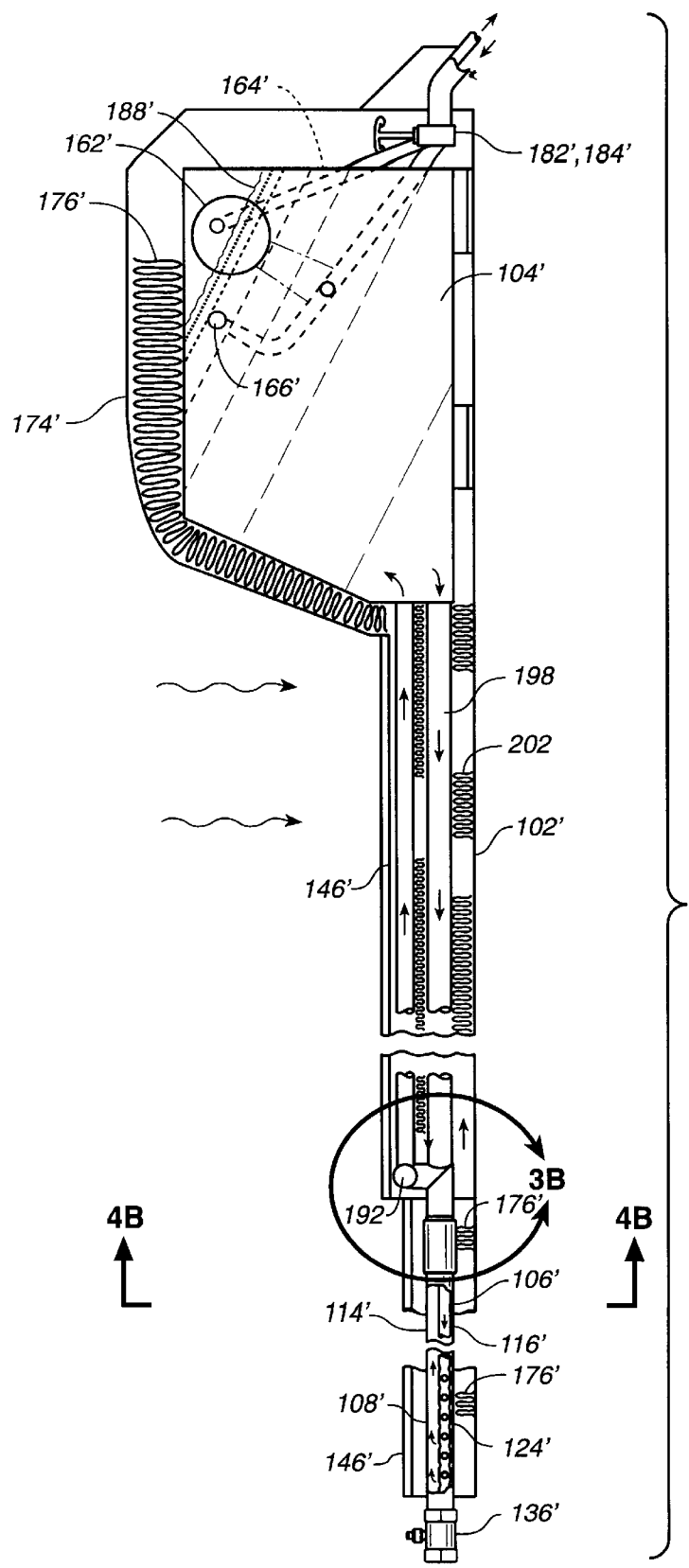
FIG._2B

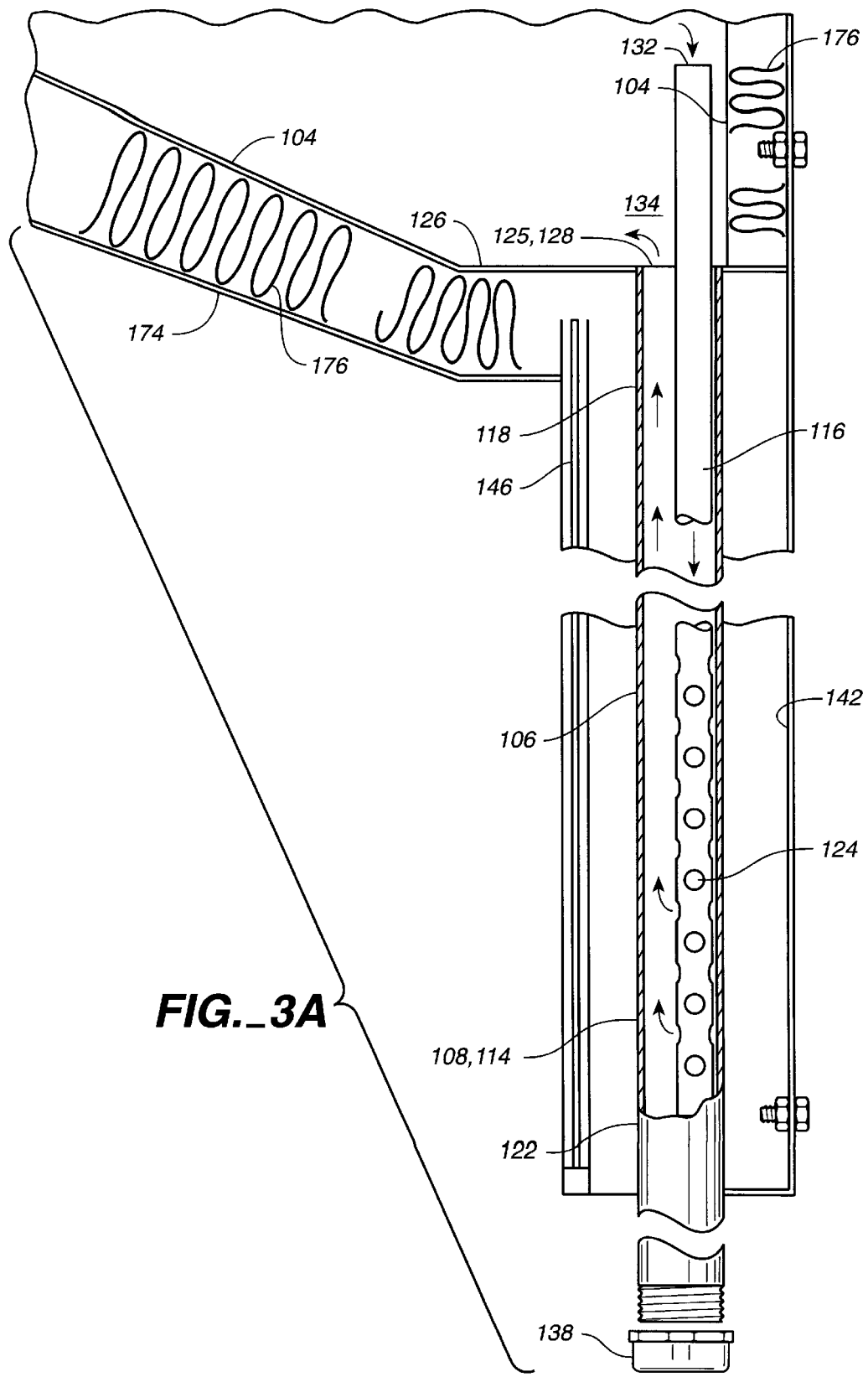
FIG._3A

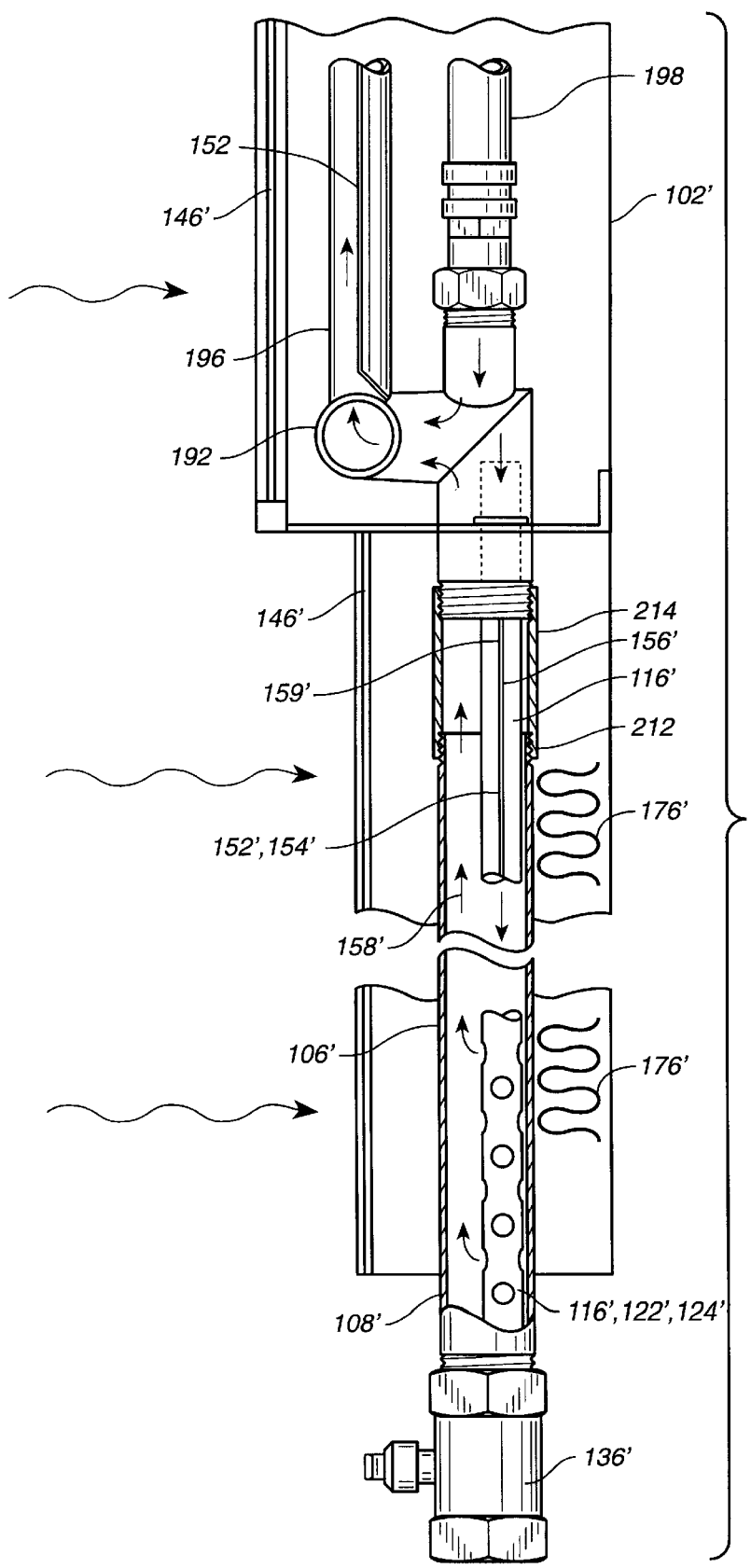
FIG._3B

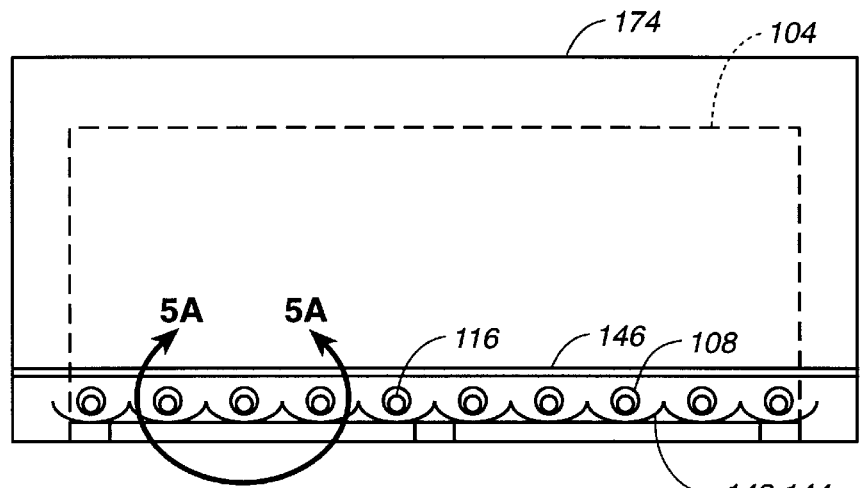
FIG._4A
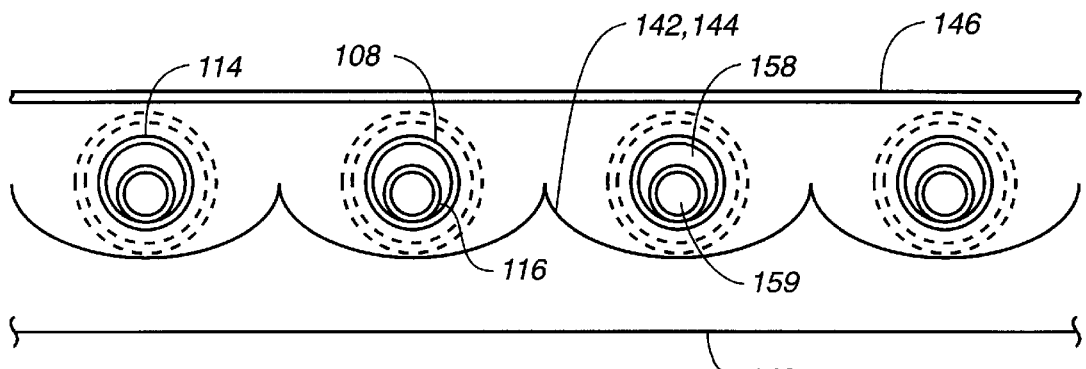
FIG._5A

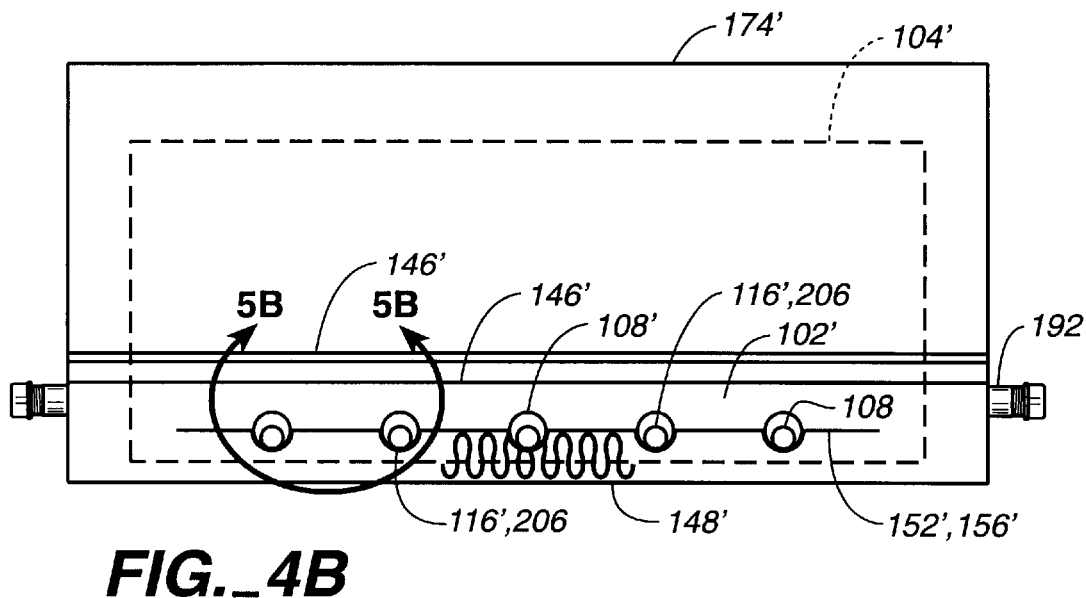
FIG._4B
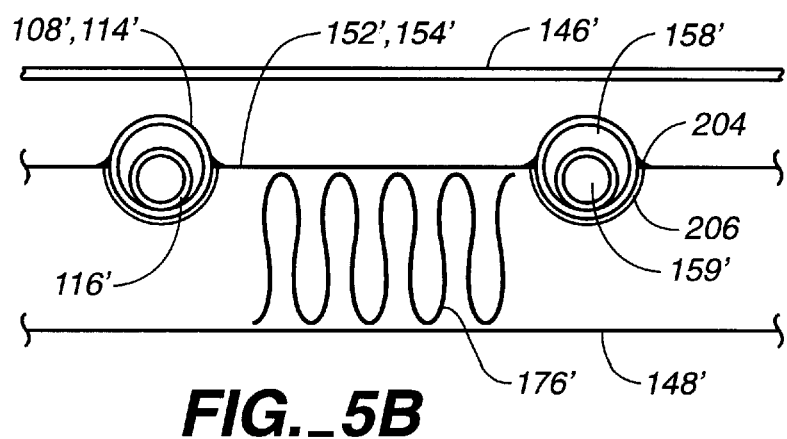
FIG._5B ness to flow due to, i.e. eddying and turbulence, and friction drag etc.
TUBULAR HEATING-PIPE SOLAR WATER-HEATING-SYSTEM WITH INTEGRAL TANK

BACKGROUND OF THE INVENTION

1. Field of the Invention

This invention relates generally to solar water-heating-systems, and more specifically to an improved solar water-heating-system having a collector core which includes heating-pipes in each of which countercurrent flows of hot and cold fluid pass in opposite directions.

2. Description of the Prior Art

A solar water-heating-system to which the present invention particularly relates comprises a solar water-heating-panel connected to a hot-water storage-tank. Such a solar water-heating-panel frequently includes vertically oriented, parallel heating-pipes or other channels embedded in a selective absorber, such as a black metal sheet, that is inclined towards the sun. The heating-pipes generally open into horizontal manifolds or header pipes both at the top and at the bottom of the solar water-heating-panel. Sunshine heats up the selective absorber and the pipes or other channels embedded in the selective absorber. This heat is transferred by conduction to a fluid, usually water, in the heating-pipes. Upon heating, the water expands slightly so its density becomes less than that of cooler water in the other parts of the solar water-heating-system. The hotter water then rises toward the top of the inclined panel and enters the horizontal upper manifold. The heated water then rises further from the upper manifold through a bend of one or two 90 degree elbow joints before entering the hot-water storage-tank. The new incoming hotter water upon entering the hot-water storage-tank pushes its way to the top, displacing cooler water already present in the hot-water storage-tank. The displaced cooler water first sinks to the bottom of the hot-water storage-tank, after which it continues to sink down a cooler-water return-pipe located at one side of the hot-water storage-tank and down the side of the solar water-heating-panel, makes another 90 degree turn in an elbow joint, to then enter the horizontal manifold at the bottom of the solar water-heating-panel. The cooler water, after entering the manifold at the bottom of the solar water-heating-panel, is heated again by the sun's rays and the process begins anew. Thus, the temperature of water in the hot-water storage-tank increases throughout the day.

Existing thermosyphon based solar water-heating-systems of this kind normally consist of a solar water-heating-panel with a separate insulated hot-water storage-tank placed immediately above the water-heating-panel. An example of a prior art of solar water-heating-system of this type is disclosed in U.S. Pat. No. 4,084,578 that issued Apr. 18, 1978, on an application filed by Toshihiro Ishibashi ("the Ishibashi patent"). A drawing depicting the solar water-heating-system disclosed in the Ishibashi patent is included herein as FIG. 0. The Ishibashi patent discloses increasing collection efficiency by improving the selective surface of the absorber through special paints and coatings, special non-reflecting glass, utilizing different corrugation profile angles for the collector sheet, and using the hot-water storage-tank as a reflector in winter.

Placement of the hot-water storage-tank in close proximity to and immediately above the solar water-heating-panel is known to be advantageous as disclosed in U.S. Pat. No. 4,766,885 that issued Aug. 30, 1988, on an application filed by Toshiaki Muramatsu (the Muramatsu '885 patent"). However, in solar water-heating-systems such as that disclosed in the Muramatsu '885 patent, the hot water must flow horizontally across the breadth of the solar water-heating-panel, or even worse, across two panels if it is a two panel system, before entering the hot-water storage-tank. Moreover, before entering the hot-water storage-tank, the hot water must also flow through one or two elbow joints with all their attendant increase in resistance to flow due to form drag, i.e. eddying and turbulence, and friction drag etc. which impedes thermosyphon flow.

It is well known that slowing down natural thermosyphon flow reduces the efficiency of the heat collection because the water in the horizontal manifold becomes trapped, unable to move in its natural upwards direction. Consequently, water in the horizontal manifold gets hotter and hotter as it continues to absorbs solar radiation. This relatively stagnant flow of hot water in the upper manifold, in the upper part of the heating-pipes, and in the elbow joints becomes disadvantageously hot, and radiates away heat through glass covering the solar water-heating-panel. Furthermore, some heat energy of the rising hot water in the vertical heating-pipes is also lost or expended in pushing the flow along the horizontal manifolds. All of these losses reduce the overall heat transfer coefficient of efficiency.

U.S. Pat. No. 4,353,352, that issued Oct. 12, 1982, to Michael F. Zinn ("the Zinn patent"), discloses an improved thermosyphon flow having a near direct connection from the heating-pipes to the hot-water storage-tank. However, solar water-heating-system disclosed in the Zinn patent forces the hot water to travel in a roundabout way from the top of the panel, curving behind the tank, before entering the tank itself. Furthermore, the Zinn patent also shows that upon entering the hot-water storage-tank the hot water must also flow downwards, against thermosyphon flow, because the outlets of the hot water inlet-pipes are located at the very top of the tank, pointing downwards. Placing the inlet-pipes at the top of the hot-water storage-tank causes hot water to build-up in this area and to become congested once some hot water has accumulated at the top of the tank. This congestion occurs because any new incoming hot water must drive the existing layer of hot water downwards within the hot-water storage-tank. Since this layer of hot water naturally resists flowing downward, the "plug" of hot water around the top of the tank effectively slows down the thermosyphon flow even more. Again, thermal collection inefficiency rises as the amount of hot water increases.

Known prior art solar water-heating-systems, including those disclosed in the Ishibashi and Zinn patents have the cooler-water return-pipe located at the side of the water-heating-panel. This location for the cooler-water return-pipe impedes the thermosyphon flow since horizontal runs, which impede the natural upwards or downwards movement of thermosyphon flow, are then necessary across the width of the solar water-heating-panel(s). In prior art solar water-heating-systems, not only does the cooler water, which wants to sink, have to travel horizontally across the length of the hot-water storage-tank before finding the outlet leading down to the panel, but upon reaching the bottom of the panel, the cooler water must travel horizontally back across the width of the panel before reaching the furthest heating-pipe. Thus, in prior art thermosyphon solar water-heating-systems only a few of the heating-pipes near the lower manifold'ms inlet and the upper manifold's outlet operate at peak heat collecting efficiency. Consequently, a significant portion of a solar water-heating-panel located at a distance from the manifolds' inlet and outlet experience stagnant or retarded flow.

U.S. Pat. No. 4,724,826, that issued Feb. 16, 1988, on another application filed by Toshiaki Muramatsu ("the Muramatsu '826 patent"), as well as the Muramatsu '885 patent, disclose a two phase system in which a working-fluid, gasified by solar radiation in an evaporator portion of a heat pipe, conducts heat to a condenser portion of the heat pipe where the working fluid returns to the liquid phase. In the solar water heaters disclosed in the Muramatsu '885 and '826 patents, gaseous heat-conducting fluid rises upwards while condensed heating-fluid descends downwards countercurrently within a multiplicity of hermetically sealed parallel channels included in a plate-like, solar heating-panel. In the systems disclosed in the Muramatsu '885 and '826 patents, the heating-fluid, apparently Freon or a like working fluid sealed within the plate-like heat absorber, must be isolated from the water to be heated in the hot-water storage-tank. Accordingly, in the systems disclosed in the Muramatsu '885 and '826 patents the water in the storage-tank is indirectly heated through conduction while passing through a heat exchanger which also contains the working-fluid, or an intermediate working-liquid heated by the gaseous first working-fluid.

Existing prior art solar hot water panels are also susceptible to mechanical damage if water in the heating-pipes freezes and cracks the heating-pipes. Some prior art systems have addressed this problem through an indirect system in which solar radiation heats an antifreeze solution in heating-pipes, or is heated at the condenser portion of heat pipes. The hot antifreeze solution then circulates through a heat exchanger located in the hot-water storage-tank to heat the water. This type of solar water-heating-system is inefficient since the water is only indirectly heated by the antifreeze solution. Consequently, this indirect solar water-heating-panel system heats less water than a direct solar water-heating-system in which the water being heated circulates through heating-pipes. Moreover, indirect solar water-heating panel systems are more expensive and complicated that a direct solar water-heating-system, and require maintenance including regular topping up of any intermediate-working liquid antifreeze solution if such is used.

SUMMARY OF THE INVENTION

It is therefore an object of this invention to provide an improved solar water-heating-system that reduces inefficiencies inherent in prior thermosyphon flow systems.

Another object of the present invention is to provide an improved thermosyphon circulation solar water-heating-system that reduces horizontal flows by a direct, upward connection of heat pipes which permits hot water to flow naturally and without unnecessary impedance into the lower level of the hot-water storage-tank.

Another object of the present invention is to provide an improved thermosyphon circulation solar water-heating-system that reduces horizontal flows by having direct, downward, separate, centrally located cooler-water return-pipes.

Another object of the present invention is to provide an improved thermosyphon circulation solar water-heating-system having physically separated upwards and downwards flows thereby avoiding drag, turbulence and mixing between flows in opposite directions.

Another object of the present invention is to provide an improved thermosyphon circulation solar water-heating-system having reduced night-time heat losses.

Another object of the present invention is to provide an improved thermosyphon circulation solar water-heating-system that withstands freezing temperatures without damage, whilst still retaining high efficiencies and simplicity of use.

Accordingly, one form of the present invention comprises an improved solar water-heating collector core (106) adapted for incorporation into a solar water-heating-system (100) by being joined to a lower portion (125) of a hot-water storage-tank (104). The solar water-heating collector core (106) includes a plurality of hollow heating-pipes (108), each heating-pipe (108) having a longitudinal axis (112) and an interior that is surrounded by an outer wall (114). The heating-pipes (108), when assembled to form the collector core (106), are arranged so the longitudinal axis (112) are disposed substantially parallel to each other with the heating-pipes (108) inclined to the horizontal with an upper end (118) of each heating-pipe (108) being elevated above a lower end (122). The lower end (122) of each heating-pipes (108) is closed, and the upper end (118) of each heating-pipes (108) is open and is adapted to extend directly to, open into, and communicate directly with a lower level (134) of the hot-water storage-tank (104), or with the lower portion (193) of the solar water-heating-panel (102).

In a preferred embodiment, the solar water-heating collector core (106) further includes a cooler-water return-pipe (116) enclosed within the outer wall (114) of each heating-pipes (108). The cooler-water return-pipe (116) within each heating-pipes (108) has an internal cross-sectional area that is approximately equal to to one-third (⅓) to one-half (½) of an internal cross-sectional area of the outer wall (114) of the heating-pipes (108). Each cooler-water return-pipe has a length that is slightly longer than a length of the outer wall (114) of the heating-pipes (108) so the open upper end (132) of the cooler-water return-pipe (116) extends beyond the open upper end (118) of the outer wall (114). Consequently, the upper end (118) of the cooler-water return-pipe (116) extends into and communicates directly with the lower level (134) of the hot-water storage-tank (104), or with the lower portion (193) of the solar water-heating-panel (102). The lower end (122) of each cooler-water return-pipe (116) is perforated so fluid may flow outward from within the lower end (122) of each cooler-water return-pipe (116) toward the surrounding outer wall (114) of the heating-pipes (108). In geographic regions that experience freezing temperatures, the cooler-water return-pipes (116) are preferably made of a compressible material for absorbing freezing pressure of ice formation during cold periods without damage to the collector core (106).

In one embodiment of the present invention the heating-pipes (108) are thermally joined to a heat-conducting sheet (152). An upper face (154) of the heating-pipes (108) and of the heat-conducting sheet (152) has a heat-absorbing surface while a lower face (156) of the heat-conducting sheet (152) has a heat-reflective surface. In another embodiment of the present invention the heating-pipes (108) are suspended slightly above a sheet (142) having heat-reflective upper face (144) and lower face (156). The sheet (142) in this other embodiment is preferably corrugated parallel to the heating-pipes (108) with the heating-pipes (108) being located in the center of focus of the corrugations, and only the heating-pipes (108) have a heat-absorbing surface.

In an alternative application of the invention the heating-pipes (108) of the collector core (106) extend into the bottom manifold (192) of an existing solar water-heating-panel (102). Adding a collector core (106) to an existing solar water-heating-panel (102) boosts the heating capacity of the existing solar water-heating-system. The collector core (106) also acts as a sediment trap which keeps the bottom manifold (192) clean.

Because thermosyphon circulation is inherently weak and is susceptible to being slowed down by horizontal flows, or other impedances such as bends and elbows, eliminating such obstructions markedly improves heat collection efficiency. The advantage obtained by placing the outlet of the heating-pipes (108) at the lower level of the hot-water storage-tank, pointing upwards as forms part of the present invention is not recognized in the Zinn patent where the hot-water inlet-pipes are at the very top of the hot-water storage-tank pointing downwards. The direct downward flow of cooler water from the lower level of the hot-water storage-tank through the cooler-water return-pipes (116) to the lower end of the solar water-heating-panel (102) also significantly improves collection efficiency.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a perspective view of a prior art solar water-heating-system reproducing FIG. 8 of the Ishibashi patent.

FIG. 1A is a partially sectioned perspective view of a complete solar water-heating-system in accordance with the present invention having a collector core (106) that includes a plurality of heating-pipes (108) attached directly to an insulated hot-water storage-tank (104).

FIG. 1B is a partially sectioned perspective view of a complete solar water-heating-system in accordance with the present invention having a collector core (106') that includes a plurality of heating-pipes (108') attached to a bottom manifold (192) located in a lower portion of an existing solar hot water-heating-panel (102').

FIG. 2A is a cross-sectional side elevational view of the solar water-heating-system taken along the line 2A—2A in FIG. 1A showing direct connection between the collector core (106) of heating-pipes (108) and a lower portion of the hot-water storage-tank (104).

FIG. 2B is a cross-sectional side elevational view of the solar water-heating-system with taken along the line 2B—2B in FIG. 1B showing the collector core (106') of heating-pipes (108') attached to the bottom manifold (192) of an existing solar water-heating-panel (102').

FIG. 3A is a detail cross-sectional side elevational view of the solar water-heating-system collector core (106) taken along the lines 3A—3A in FIG. 2A showing connection of the heating-pipes (108) with the lower portion of the hot-water storage-tank (104), and also showing perforations that pierce a lower end (122) of a cooler-water return-pipe (116).

FIG. 3B is a detail cross-sectional side elevational view of the solar water-heating-system collector core (106') taken along the lines 3B—3B in FIG. 2B showing the attachment of the heating-pipes (108') to the bottom manifold (192) of an existing solar water-heating-panel (102'), and also showing perforations that pierce a lower end (122') of a cooler-water return-pipe (116').

FIG. 4A is a cross-sectional, transverse, elevational view through the heating-pipes (108) taken along the line 4A—4A in FIG. 2A showing the hot-water storage-tank (104) in the background, and a detail transverse section through the collector core (106) disposed above a reflective sheet (142) with the heating-pipes (108) located at the focus of corrugations formed in a reflective sheet (142).

FIG. 4B is a cross-sectional, transverse, elevational view through the heating-pipes (108') taken along the line 4B—4B in FIG. 2B showing the existing solar water-heating-panel (102') in the background, and a detail transverse section through the collector core (106') with the heating-pipes (108') thermally joined to a heat-conducting sheet (152').

FIG. 5A is a cross-sectional, transverse, elevational view taken along the line 5A—5A in FIG. 4A depicting disposition of the heating-pipes 108 at the focus of corrugations formed in the reflective sheet (142).

FIG. 5B is a cross-sectional, transverse, elevational view taken along the line 5B—5B in FIG. 4A depicting thermal joining of the heating-pipes (108') to the heat-conducting sheet (152').

DETAILED DESCRIPTION OF THE PREFERRED EMBODIMENT

FIG. 1A depicts a solar water-heating-system in accordance with the present invention referred to by the general reference character 100. The solar water-heating-system 100 includes a solar water-heating-panel 102 directly connected to an insulated hot-water storage-tank 104. The solar water-heating-panel 102 includes a collector core 106 assembled from a plurality of heating-pipes 108. The heating-pipes 108 have longitudinal axes 112 that are arranged substantially parallel. The heating-pipes 108 are preferably spaced equidistantly apart as indicated in FIG. 1A. In a highly preferred form, the heating-pipes 108 are spaced at approximately 90 mm centers, although this spacing may be varied to suit particular circumstances. The solar water-heating-panel 102 is preferably 945 cm wide, and excluding the hot-water storage-tank 104, is preferably 1750 cm long.

Each heating-pipe 108 has an outer wall 114, best illustrated in FIG. 5A, which surrounds a smaller cooler-water return-pipe 116. The outer wall 114 of each heating-pipe 108 may be formed, for instance, from galvanized iron, stainless steel, copper or the like of 25 mm or other suitable internal diameter. Each cooler-water return-pipe 116 is formed from PVC, PB or other compressible material. The cooler-water return-pipe 116 of each heating-pipe 108 has an internal cross-sectional area that is approximately equal to one-third (⅓) to one-half (½) of an internal cross-sectional area within the outer wall 114 of the heating-pipe 108. For a heating-pipe 108 whose outer wall 114 has an internal diameter of 25 mm, the cooler-water return-pipe 116 preferably has an internal diameter of approximately 15 mm. The heating-pipes 108 forming the collector core 106 are adapted to be inclined to the horizontal when in use with an open upper end 118 of the heating-pipe 108 being elevated above a closed lower end 122 of each heating-pipe 108. Each cooler-water return-pipe 116 has a length that is slightly longer than a length of the surrounding outer wall 114 of the heating pipe 108. The lower end 122 of each cooler-water return-pipe 116, e.g. approximately 200 mm, is perforated with a plurality of apertures 124, best illustrated in FIG. 3A. The apertures 124 allow easy passage of water between the inner cooler-water return-pipe 116 and the outer wall 114 of the heating-pipe 108.

As best illustrated in FIG. 3A, the upper end 118 of the outer wall 114 of each heating-pipe 108 enters a lower portion 125 of the hot-water storage-tank 104 and finishes flush with an inner surface 126 of the hot-water storage-tank 104. The cooler-water return-pipe 116 protrudes approximately 90 mm into the hot-water storage-tank 104. This physical separation of 90 mm between an opening 128 of the outer wall 114 of the heating-pipe 108 into the hot-water storage-tank 104 and an opening 132 of the cooler-water return-pipe 116 that extends into a lower level 134 within the hot-water storage-tank 104 ensures that incoming, rising hot water will not be sucked back into the cooler-water return-pipe 116.

As illustrated in FIG. 3A, the opening 132 of the cooler-water return-pipe 116 is adjacent to the bottom of the hot-water storage-tank 104 which ensures that only cooler water, which is stratified at the bottom of the hot-water storage-tank 104, is sucked back towards the lower end 122 of the heating-pipes 108 to be reheated. The lower end of each heating-pipe 108 is closed by a drain valve 136, as illustrated in FIGS. 1A and 2A, or a cap 138, as illustrated in FIG. 3A. Closing each individual heating-pipe 108 with the drain valve 136 facilitates purging from the heating-pipes 108 sediment that settles to the lower end 122.

As best illustrated in FIGS. 4A and 5A, in one embodiment the heating-pipe 108 are placed approximately 25 mm above a corrugated, highly reflective sheet 142, such as reflective aluminum foil or other reflective metal sheet having heat-reflective upper and lower surfaces. The reflective sheet 142 is shaped to place the heating-pipes 108 at centers of focuses of corrugations. In this embodiment of the solar water-heating-panel 102, the entire outer wall 114 of the heating-pipes 108 have solar heat-absorbent surfaces so that, disposed in such location with respect to the reflective sheet 142, the heating-pipes 108 receive and absorb the maximum direct and reflected solar radiation throughout the day. This solar water-heating-panel 102 of heating-pipes 108 over the reflective sheet 142 may be left exposed to the sun either unglazed or encased within a transparent glass cover 146 and insulated casing 148 as illustrated in FIG. 1A.

A portion of the solar water-heating-panel 102 extending below the casing 148 in the illustration of FIG. 1A depicts an alternative embodiment of the collector core 106 in which each heating-pipe 108 is joined in good thermal contact with a heat-conducting sheet 152. In a highly preferred form, the sheet 152 comprises a metal sheet preferably corrugated so an upper face 154, which in use faces the sun, is formed into a highly solar heat-absorbent surface while a lower face 156 of the metal sheet has a reflective surface. A preferred method of obtaining the heat-absorbant upper face 154 is to paint the upper face 154 of the metal sheet and of the outer wall 114 of the heating-pipes 108 with a suitable matte black paint or selective absorbing material, and to face the lower face 156 of the metal sheet with a reflective silver foil. The sheet 152 is preferably formed, as is known in the art, to capture the maximum amount of solar radiation as the sun passes through the sky.

The collector core 106 may be exposed, or part or all of it may be suitably housed within the casing 148 as in FIGS. 1A to 4A. The casing 148 has a transparent cover 146 which may typically be of glass or the like. When the collector core 106 is positioned within the casing 148 so that the glass cover 146 faces the sun, solar radiation, which passes through the glass cover 146, is absorbed by the absorbent surface of the outer wall 114 of the heating-pipes 108, and by the upper face 154 of the sheet 152 if the sheet 152 is thermally joined to the outer wall 114. Absorbtion of solar radiation by the outer wall 114 of the heating-pipe 108, and also possibly by the sheet 152, heats water within the outer wall 114 of the heating-pipes 108.

As illustrated in FIG. 5A, the planar glass cover 146 may alternatively be provided by hollow glass tubes, depicted by dashed lines in FIG. 5A, that individually encircle the outer wall 114 of each heating-pipe 108. Tubular glazing such as that illustrated in FIG. 5A, although comparatively expensive, collects and concentrates more heat at low sun angles.

In either embodiment, when the heating-pipes 108 heat up, water between the outer wall 114 and the inner cooler-water return-pipe 116 rises into the hot-water storage-tank 104. Cooler water that has settled to the bottom of the hot-water storage-tank 104 is sucked into the cooler-water return-pipe 116 and flows downwards inside the cooler-water return-pipe 116 to replace the rising hot water. The cooler water then flows outward through the apertures 124 at the lower end 122 of the cooler-water return-pipe 116 toward the outer wall 114, and is heated in turn and starts to rise within the outer wall 114.

As can be seen particularly from FIG. 2A, the outer wall 114 of each heating-pipe 108 extends to and opens into the insulated hot-water storage-tank 104 near the bottom of the hot water storage tank 104. Consequently, because the heating-pipe 108 communicates with the hot-water storage-tank 104 water heated within the heating-pipe 108 rises without interruption into the hot-water storage-tank 104 thereby avoiding the hot water congestion "plug" at the top level of the hot-water storage-tank 104 by entering below the level of the hot water "plug". Hot water entering into the hot-water storage-tank 104 is therefore not retarded in its circulation because there are no horizontal flows or bends or superfluous piping lengths in either the upward or downward parts of the thermosyphon circulation. Thus, heat captured by the water in the heating-pipe 108 is transferred directly to the water in the hot-water storage-tank 104 with minimal heat loss.

Although there is some minor conduction heat loss at night due to a close connection between the bottom of the hot-water storage-tank 104 and the heating-pipes 108, this heat loss is much reduced due to the stratification effect of the water in the hot-water storage-tank 104 acting as insulation layers. Only the water in the lower level 134 of the hot-water storage-tank 104 near the heating-pipe 108 cools down slightly, but this is more than made up by the improved collection efficiency during the day. Since the sheet 152, which forms the major surface area exposed to the glass, is not in direct thermal contact with the hot-water storage-tank 104 the heat loss is negligible. Placement of the collector core 106 below the hot-water storage-tank 104 also prevents reverse circulation at night when the panel radiates heat out into the night sky. Only the water inside the heating-pipe 108 is cooled by night time radiation, and since this cool water cannot descend any further, there is no reverse circulation when the sun is not shining. Thus at night, the hot water in the insulated hot-water storage-tank 104 remains hot and does not flow into the cooler collector core 106 below.

There is thus no horizontal flow at all in this solar collector core 106, leading to very high efficiencies in thermosyphon circulation. As the water becomes hotter and hotter towards the afternoon, the temperature differential between the top and bottom of the hot-water storage-tank becomes less and less. Similarly, the temperature differential between the hot water between the outer wall 114 of the heating-pipe 108 and cooler water in the cooler-water return-pipe 116 becomes less and less. If the cooler-water return-pipe 116 were laterally displaced as in prior art, i.e. at the side of the solar water-heating-panel 102, instead of directly inside the heating-pipes 108, the thermosyphon flow would slow down considerably in the afternoon due to the enforced horizontal flow and reduced temperature differential. The present invention does not suffer from this reduced flow in the afternoon as there is no horizontal flow. Accordingly, the thermosyphon flow occurs efficiently throughout the day.

Thermosyphon flow is not only inherently weak, but its natural movement is directly up or directly down, relying solely on the difference in densities between hot and relatively cooler water. Thus, any impediment to its free flow upwards or downwards such as enforced horizontal runs greatly reduces the overall efficiency of the solar heating system. As illustrated in FIG. 5A, rising hot-water 158 flows between the outer wall 114 and the cooler-water return-pipe 116 of the heating-pipe 108, while cooler-water 159 sinks within the cooler-water return-pipe 116.

By reason of the present invention a considerable increase in the efficiency of thermosyphon flow can be obtained. The system allows hot-water 158 to flow upwards smoothly and directly without any inefficient twists or horizontal flow, and allows the return downward flow of cooler-water 159 to be similarly direct and with absolutely no horizontal flow component.

Placing the cooler-water return-pipe 116 inside the heating-pipe 108 also allows reducing the width of the solar water-heating-panel 102.

Cold water enters the hot-water storage-tank 104 from a supply tank or mains supply, not illustrated in any of the Figures, preferably through a ball float valve 162 depicted in FIG. 1A. The ball float valve 162 preferably has a perforated outlet baffle 164 to prevent mixing of cold water with hot water. Hot water is drawn out at the top of the hot-water storage-tank 104 through a floating outlet 166 which ensures that the outlet is always at the topmost (hottest) level of the water in the hot-water storage-tank 104.

The hot-water storage-tank 104, which includes an overflow 172, is enclosed within a housing 174 which can be formed from a metal, such as stainless steel or aluminum, or from a plastic material such a fiberglass. As illustrated in FIGS. 2A and 3A, a layer of thermal insulation 176 separates the housing 174 from the hot-water storage-tank 104. An inlet gate-valve 182 and an outlet gate-valve 184 are also enclosed between the housing 174 and the hot-water storage-tank 104. A line 188 in FIG. 2A indicates the water level within the hot-water storage-tank 104 upon orientation of the solar water-heating-system 100 to its inclined position.

FIGS. 1B to 5B depict an alternative embodiment of the collector core 106 installed as a booster that is connected to a bottom manifold 192 located in a lower portion 193 of an existing solar water-heating-panel 102 to increase the heating. Those elements depicted in FIGS. 1B–5B that are common to the solar water-heating-system 100 depicted in FIGS. 1A–5A carry the same reference numeral distinguished by a prime ("'") designation. In the illustration of FIG. 1B, the existing solar water-heating-panel 102' employs a sheet 152' that is joined in good thermal contact to an outer wall 194 of heating-pipes 196. The sheet 152' preferably comprises a metal sheet having an upper face 154', which in use faces the sun, and a lower face 156'. The upper face 154' and an upper face of the heating-pipes 196 are painted with a suitable matte black paint or selective absorbing material to make them heat-absorbing. The lower face 156' of the sheet 152' is covered with a silver foil thereby making the lower face 156' heat-reflective. To return cooler water from the hot-water storage-tank 104' to the bottom manifold 192, the existing solar water-heating-panel 102' of the type depicted in FIGS. 1B, 2B and 3B employs separate cooler-water return-pipes 198 disposed within an insulation la er 202 that is located centrally (if only one return-pipe) or evenly distributed (if multiple return-pipes) beneath the lower face 156'.

FIGS. 4B and 5B depict thermally-conductive joints 204 between the outer wall 114' of the heating-pipe 108' and the sheet 152' for the collector core 106' depicted in FIG. 1B.

The sheet 152' is formed with corrugations 206 shaped to receive the outer wall 114' of the heating-pipes 108'. The heating-pipes 108' are joined to the corrugations 206 so as to provide good thermal conductivity between the outer wall 114' of the heating-pipes 108' and the sheet 152'. The heating-pipes 108' may be joined to the corrugations 206 in various diffeent ways such as with a heat conducting epoxy material, with mechanical clamping, or by welding. The thermally-conductive joints 204 depicted in FIGS. 4B and 5B including the corrugations 206 are also used for joining the outer all 114 of the heating-pipes 108 to the sheet 152 that is depicted below the casing 148 in FIG. 1A. As illustrated in FIGS. 2B and 3B, the upper face 154' of the sheet 152' included in the alternative embodiment collector core 106 is preferably covered with a transparent glass cover 146'. Similarly, a layer of thermal insulation 176' is juxtaposed with the lower face 156' of the sheet 152'.

The heating-pipes 108 may be secured to the hot-water storage-tank 104 or to the bottom manifold 192 of the collector core 106' in various different ways. For example each heating-pipe 108 may be welded, coupled with compression fittings, clamped or glued to the hot-water storage-tank 104. Each heating-pipe 108 may also be similarly secured to the bottom manifold 192 of the collector core 106' in these same ways, or may be screwed into a socket 212 provided by a coupling 214 as illustrated in FIG. 3B. The screwing of each heating-pipe 108 into the socket 212 in conjunction with use of the corrugations and reflective sheet 142, that are depicted in FIGS. 4A and 5A, particularly facilitates shipping of the collector core 106 to and its assembly at remote sites. The present invention preferably includes the cooler-water return-pipes 116 enclosed within the heating-pipes 108 to facilitate passage of countercurrent flows of rising hot-water 158 and descending cooler-water 159 without mixing or turbulence. However, if the cooler-water return-pipes 116 are removed from within the heating-pipes 108, thermosyphon flow still causes the hot-water 158 to rise up without interruption into the hot-water storage-tank 104, and the cooler-water 159 in the lower portion 193 of the hot-water storage-tank 104 to be sucked into the lower half of the heating-pipes 108. The cooler-water 159 sucked into the heating-pipes 108 then flows downward within the lower half of the heating-pipes 108 past the rising hot-water 158 which the cooler-water 159 replaces. Thus, in such a collector core 106 lacking the cooler-water return-pipes 116, the cooler-water 159 reaches the lower end 122 of the heating-pipes 108, is heated in turn, and then rises toward the hot-water storage-tank 104 in the upper half of the heating-pipes 108. This alternative embodiment collector core 106 lacking the cooler-water return-pipes 116 still avoids the horizontal flows that significantly impede thermosyphon flow, and that correspondingly reduce thermal collection efficiency.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A solar water-heating collector core (106) adapted for incorporation into a solar water-heating-system (100) either by being joined to a lower portion (125) of a hot-water storage-tank (104), or by being joined to a lower portion (193) of another solar water-heating-panel (102), the solar water-heating collector core (106) comprising:

a plurality of hollow heating-pipes (108), each heating-pipe (108) having a longitudinal axis (112) and an interior that is surrounded by an outer wall (114); said heating-pipes (108), when assembled to form the collector core (106), being arranged so the longitudinal axes (112) are disposed substantially parallel to each other; said heating-pipes (108) being adapted to be inclined to the horizontal when in use with an upper end (118) of each heating-pipe (108) being elevated above a lower end (122) of each heating-pipe (108); the lower end (122) of each heating-pipe (108) being closed, and the upper end (118) of each heating-pipe (108) being open and adapted to extend directly to, open into, and communicate directly with a lower level (134) of the hot-water storage-tank (104) or with the lower portion (193) of the solar water-heating-panel (102); and a plurality of hollow cooler-water return-pipes (116) each of which is surrounded by the outer wall (114) of one of the heating-pipes (108); the cooler-water return-pipe (116) within each heating-pipe (108) having an internal cross-sectional area that is approximately equal to one-third (⅓) to one-half (½) of an internal cross-sectional area of the outer wall (114) of the heating-pipe (108), and having a length that is slightly longer than a length of the outer wall (114) of the heating-pipe (108) so the open upper end (132) of the cooler-water return-pipe (116) extends beyond the open upper end (128) of the outer wall (114) thereby permitting the upper end (132) of the cooler-water return-pipe (116) to extend into and communicate directly with the lower level (134) of the hot-water storage-tank (104) or with the lower portion (193) of the solar water-heating-panel (102); and the lower end (122) of each cooler-water return-pipe (116) being perforated so fluid may flow outward from within the lower end (122) of each cooler-water return-pipe (116) toward the surrounding outer wall (114) of said heating-pipe (108).

2. The solar water-heating collector core (106) of claim 1 wherein said heating-pipes (108) are thermally joined to a heat-conducting sheet (152), wherein an upper face (154) of said heat-conducting sheet (152) and of said heating-pipes (108) are provided with a heat-absorbing surface, and wherein a lower face (156) of said heat-conducting sheet (152) is provided with a heat-reflective surface.

3. The solar water-heating collector core (106) of claim 1 wherein said heating-pipes (108) are disposed slightly above a sheet (142) having heat-reflective upper face (144) and lower face (156), and wherein said heating-pipes (108) are provided with a heat-absorbing surface.

4. The solar water-heating collector core (106) of claim 1 wherein said collector core (106) further comprises a casing (148) having a transparent cover (146) disposed over the heating-pipes (108), and thermal insulation (176) disposed beneath the heating-pipes (108).

5. The solar water-heating collector core (106) of claim 1 wherein the heating-pipes (108) are adapted to screw into sockets (212) that are joined either to the lower portion (125) of the hot-water storage-tank (104), or to the lower portion (193) of another solar water-heating-panel (102).

6. The solar water-heating collector core (106) of claim 1 wherein the heating-pipes (108) are joined to the bottom manifold (192) of the solar water-heating-panel (102).

7. The solar water-heating collector core (106) of claim 1 wherein said collector core (106) further comprises the hot-water storage-tank (104).

8. The solar water-heating collector core (106) of claim 7 wherein said cooler-water return-pipes (116) are made of a compressible material for absorbing freezing pressure of ice formation during cold periods without damage to the collector core (106).

9. The solar water-heating collector core (106) of claim 7 wherein said heating-pipes (108) are thermally joined to a heat-conducting sheet (152), wherein an upper face (154) of said heat-conducting sheet (152) and of said heating-pipes (108) are provided with a heat-absorbing surface, and wherein a lower face (156) of said heat-conducting sheet (152) is provided with a heat-reflective surface.

10. The solar water-heating collector core (106) of claim 7 wherein said heating-pipes (108) are disposed slightly above a sheet (142) having heat-reflective upper face (144) and lower face (156), and wherein said heating-pipes (108) are provided with a heat-absorbing surface.

11. The solar water-heating collector core (106) of claim 7 wherein said collector core (106) further comprises a casing (148) having a transparent cover (146) disposed over the heating-pipes (108), and thermal insulation (176) disposed beneath the heating-pipes (108).

12. The solar water-heating collector core (106) of claim 7 wherein the heating-pipes (108) are adapted to screw into sockets (212) that are joined either to the lower portion (125) of the hot-water storage-tank (104), or to the lower portion (193) of another solar water-heating-panel (102).

* * * * *